Figure 1:
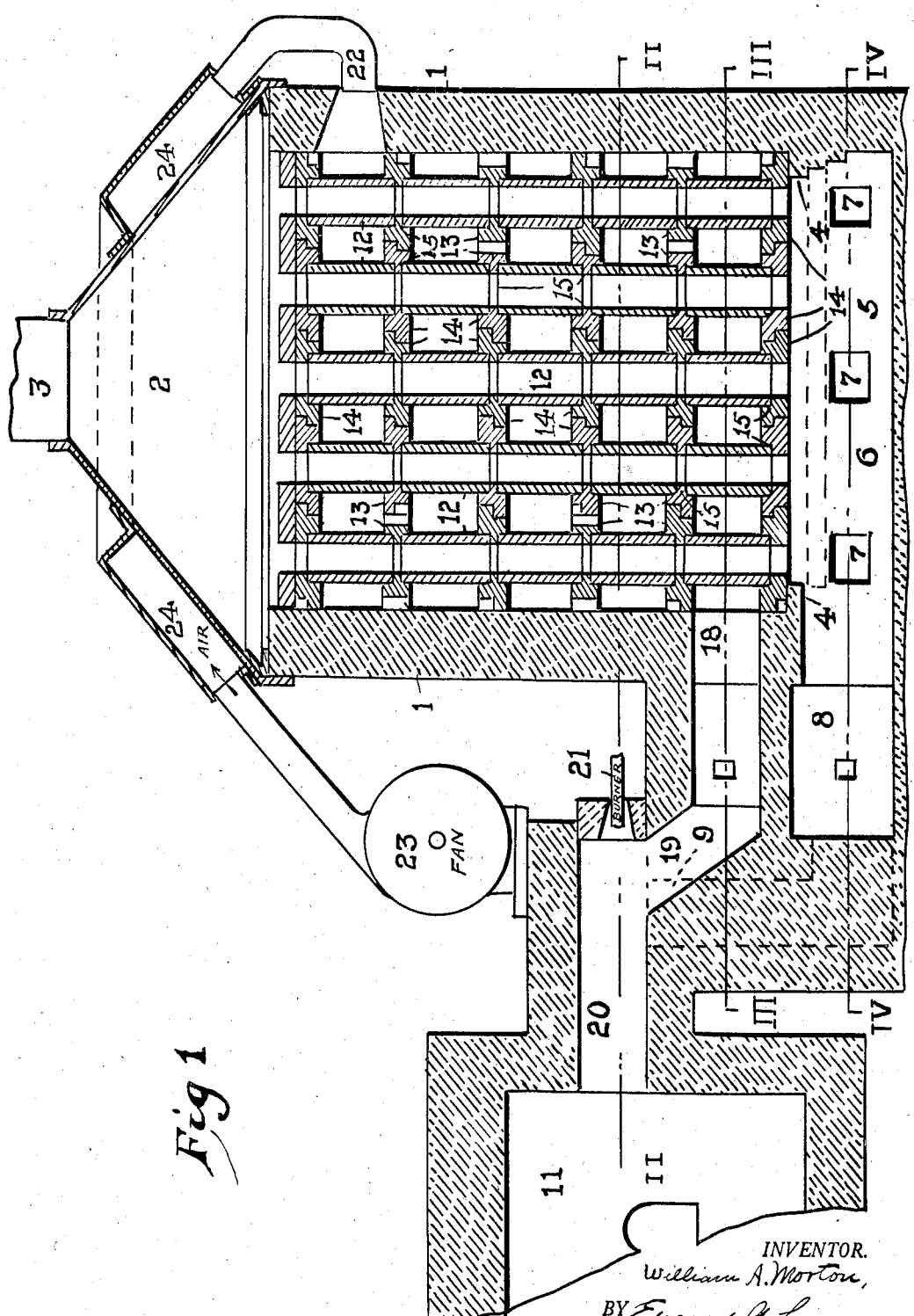

March 1, 1927. 1,619,747

W. A. MORTON

RECUPERATOR

Filed Aug. 25, 1925  2 Sheets-Sheet 1

INVENTOR.
William A. Morton,
BY Edward A. Lawrence,
his ATTORNEYS.

March 1, 1927.
W. A. MORTON
RECUPERATOR
Filed Aug. 25, 1925
1,619,747
2 Sheets-Sheet 2
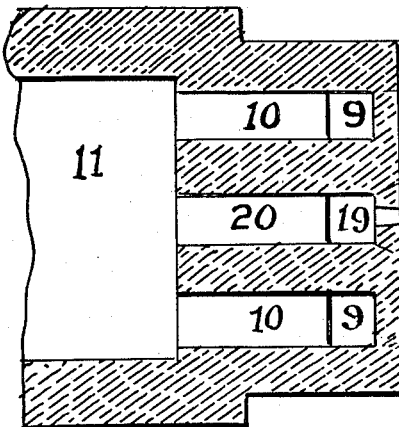
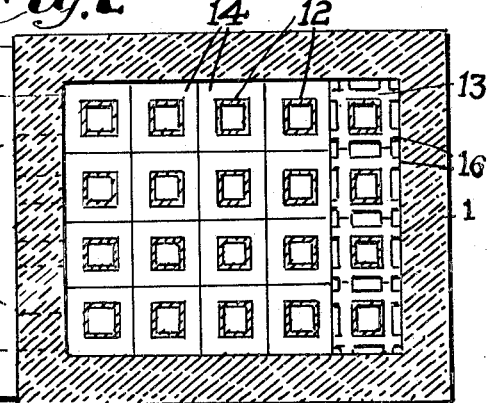
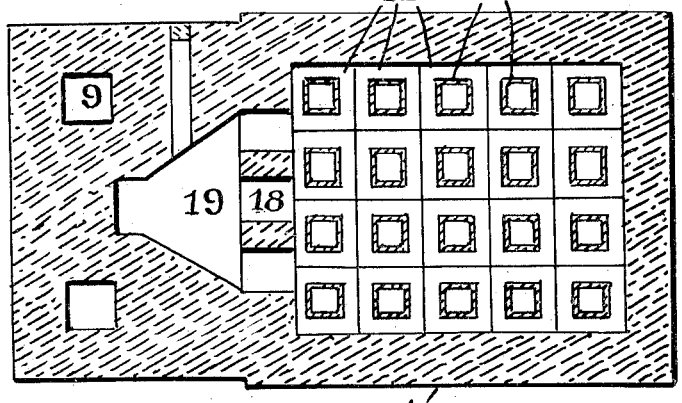
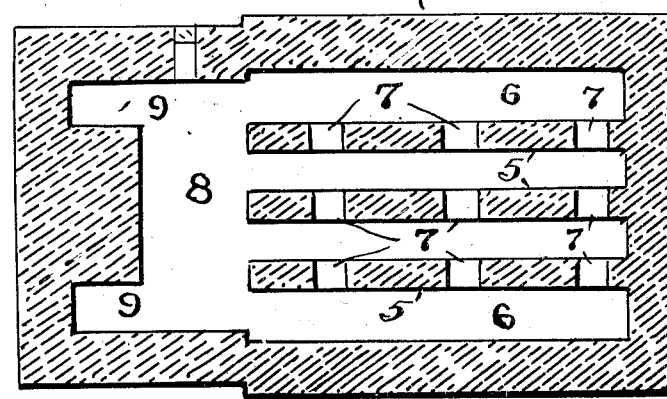
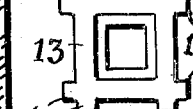
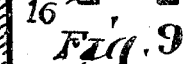
INVENTOR.
William A. Morton,
BY Edward A. Lawrence
his ATTORNEYS.

Patented Mar. 1, 1927.

1,619,747

UNITED STATES PATENT OFFICE.

WILLIAM A. MORTON, OF PITTSBURGH, PENNSYLVANIA, ASSIGNOR TO THE AMSLER-MORTON COMPANY, OF PITTSBURGH, PENNSYLVANIA, A CORPORATION OF PENNSYLVANIA.

RECUPERATOR.

Application filed August 25, 1925. Serial No. 52,336.

My improved recuperator is adapted for use in connection with furnaces, tanks and pots in glass factories, and also with heating furnaces, reheating furnaces, welding and annealing furnaces, crucible and other furnaces in steel mills, and the like.

In my improved recuperator the waste heat passages are vertical, preferably being formed of vertically disposed flue-tile, in superimposed relation, and interlocked together by means of flange-tile, the weight of the superimposed tile insuring sealed joints. The waste-heat flues are held in properly spaced relation by the interengagement of the flange-tile. The air is caused to pass horizontally around the waste-heat flues by means of horizontal return passages, the horizontal air passages being defined by flange-tile of proper form to provide horizontal floors or partitions.

I prefer to introduce the air to be heated into the upper portion of the recuperator and to withdraw it from the lower portion thereof.

I also provide new and improved means for preliminarily heating the air before its introduction into the recuperator, such means preferably also being utilized for preventing the overheating or burning out of the dome of the recuperator through which the waste gases escape.

I also provide means whereby the preheated air traveling from the recuperator towards the furnace is brought into close proximity to the waste furnace gases which are passing from the furnace to the recuperator, thereby superheating the air as it enters the furnace and also reducing the temperatures of the waste furnace gases to within the refractory limit of the tile, of which the interior of the recuperator is composed, such reduction being accomplished without thermal losses.

Other novel features of construction, and also of arrangement of parts will appear from the following description.

In the accompanying drawings, Fig. 1 is a vertical section of a recuperator which illustrates the best known embodiment of the principles of my invention, a portion of a connected glass tank being also shown; Figs. 2, 3 and 4 are horizontal sections taken, respectively, along the lines II—II, III—III and IV—IV in Fig. 1; Figs. 5 and 6 are respectively a horizontal section and a plan view of the type of flange-tile which I prefer to use to form the horizontal floors; Figs. 7 and 8 are similar views of the type of flange-tile which is employed to provide openings for the vertical passage of the air from one air-passage to the other, and Fig. 9 is a plan or end view of one of the flue-tile.

Referring to the drawings, the recuperator is provided with a suitable outer enclosure, such as the vertical wall or walls 1. In the drawings the recuperator is shown of rectangular form, but it will be understood that the same may be circular or have arcuate walls, if desired. The walls are built of suitable refractory material.

The top of the recuperator is provided with an upwardly contracting dome 2 which may be of steel plate, and which is connected at its apex with the escape-flue or chimney 3. Spaced above the bottom of the recuperator is the internal wall-ledge 4, and 5 represents a series of parallel base walls whose flat tops are level with the top of the ledge 4, and which divide the bottom of the recuperator into a plurality of horizontal passages 6. The walls 5 are preferably provided with ports 7 connecting the passages 6 and providing for the proper distribution of the entering waste gases to the vertical flues. The front ends of the horizontal passages 6 are connected to a cross-header flue 8 which is also horizontally disposed and connected at its ends to vertical flues 9 whose upper ends connect to the horizontal passages 10 which communicate with the upper interior of the glass tank 11 or other furnace.

The internal structure of the recuperator is shown as assembled of the vertically disposed flue-tile 12, the flange-tile 13, and the flange-tile 14 which for convenience I term "floor tile", and which may be of refractory or other suitable material.

The flue-tile 12 are illustrated in Fig. 9 where an end view of one of the same is shown. The flue tile are shown as of rectangular cross-section but the same may be circular, oval or of other desired form. Two types of flange-tile are shown. One type, 13, provides for the free passage of the air about the flue-tile, and is shown in Figs. 7 and 8. The upper and lower bore of the tile 13 is of proper form and dimensions to receive the ends of flue-tile, and 15 is an intermediate continuous shoulder, extending inwardly and intended to be interposed between ends of the upper and lower flue-tile, as shown in Fig. 1.

The tile 13 are provided with horizontally disposed and outwardly extending lugs 16 which are spaced apart. The lugs of flange-tile abut against the corresponding lugs of similar adjacent flange-tile or the perimetral edges of the adjacent floor-tile thereof, and thus brace the flue-tile in position, and also provide air-passages for the vertical movement of air between the waste gas flues.

The floor-tile 14, illustrated in Figs. 5 and 6 have bores and internal shoulders 15 similar to the tile 13, and have perimetral edges which are tongued as at 17, so the edges of adjacent tile interengage, as shown in Fig. 1, and thereby form air-tight, horizontal floors in the recuperator structure.

In assembling the recuperator interior, a floor of tile 14 is laid on the ledge 4 and the base walls 5, the tiles breaking joints on the walls, and the bores of the tiles communicating with the horizontal passages 6. The lower series of flue-tile 12 are then stepped in the bores of the tile 14, being supported by the shoulders 15. It will be noted that the bores of the flue tiles thus communicate with the horizontal passages 6 but the floor is air-tight about the flue-tile.

Floor-tile 14 are then placed on top of the flue-tile, except for the last one or more rows of flue-tile farthest remote from the point of admission or escape of the air to or from the recuperator. Thus, in Fig. 1 the last row of bottom flue-tile to the right have mounted thereon the flange tile 13, thus providing a horizontal air-tight floor for the recuperator at the top of the bottom flue-tile, except at one end where the spaces between the lugs 16 provide for the vertical passage of the air past the floor. At the other end of the recuperator, the left end in Fig. 1, I have shown the space between the first and second floors just described, connected by a wide mouth-port 18 to a rising port 19 whose upper end connects to the combustion passage 20, whose inner end communicates with the tank 11 while its outer end has inserted therein the gas burner 21.

A second series of flue-tile are stepped in the flange-tile 13 and floor-tile 14 which form the second floor, and a third floor is provided above the same, formed of the floor-tile 14 and the flange-tile 13, in this case, however, the opening in the floor, provided by the use of the flange-tile 13, being at the other or left end of the floor.

Additional series of flue-tile and flange-tile 13 and floor-tile 14 are built up to provide the desired height of recuperator interior, each floor being open at the opposite end from the floor next beneath. However, the uppermost floor which is superimposed on the top series of flue-tile is composed entirely of the floor-tile 14, thus forming an air-tight top closure. Thus horizontal air chambers are formed between the floors, the passages being so connected at their ends to the chambers above and below that the air flows horizontally first in one direction and then in the other as it passes through the recuperator.

The end of the top air chamber opposite to its end connected to the air chamber, next below, has connected thereto the air-inlet pipe 22 to which air is supplied under pressure from the fan 23.

The fan 23 may be connected directly to the pipe 22 but I prefer to admit the air from the fan to an annular chamber or jacket 24 which surrounds the dome 2 and whose inner wall is formed by the dome wall, the air-pipe 22 being connected to the chamber 24 at its other side.

It is apparent that the air introduced into the top air-chamber of the recuperator from the pipe 22 will travel forwardly within said chamber and around and between the flue-tile, and at the front end of the chamber will descend into the air-chamber next below and travel therein in a reverse direction. Thus in turn the air will pass from one chamber to the other, reversing the direction of its flow after passing into the next chamber below, and finally passing from the recuperator to the combustion passage 20.

Simultaneously the waste-gases from the tank will flow through passages 10, 9 and 8 into the bottom passages 6 and thence up the flues formed by the flue-tile 12 and out through the dome of the recuperator.

The waste-gases in the dome will preliminarily heat the air from the fan as it passes through the jacket 24, thus assisting the heating action of the recuperator, and also preventing the overheating or burning out of the dome.

The air, during its horizontal movements, flows around and between the flue-tile, and thus comes into intimate contact therewith, thereby realizing the fullest effect of the heating values of the waste gases which are ascending the flues. It will be noted that the waste furnace gases pass rearwardly through the passages 10 on either side of the combustion passage 20 and down through the vertical flues 9 on either side of the rising port 19 and thence into the cross header flue 8 under the mouth port 18 of the recuperator, and thence into the passages 6 which communicate with each other through ports 7. It is thus evident that the waste gases at their highest temperature are brought into close proximity with, separated only by relatively thin walls, the preheated air passing from the recuperator into the furnace. This serves a double purpose. First, the preheated air is thus superheated after it has left the recuperator, and the hot waste gases are reduced in temperature to within the refractory limit of the tile of which the interior of the recuperator is built. Thus the burning out of the interior of the recuperator is prevented by the reduction of the temperature of the hot waste gases from the furnace to within a safe limit, but this reduction is accomplished without thermal losses except such as result from the inevitable radiation effective in all furnaces.

The recuperator is compact, and thus is adapted to the limited space frequently available.

I prefer to introduce the air into the upper portion of the recuperator and lead it away from the lower portion thereof, but this arrangement may be reversed if found more convenient.

What I desire to claim is:—

1. In a recuperator comprising a chamber inclosed by side walls, the combination of a plurality of spaced apart, vertically disposed waste gas flues formed of flue tile assembled in alined relation and interlocking flange-tile interposed between the alined flue-tile, the flange tile in the same horizontal plane interengaging to brace the flue-tile in proper position, flange-tile at the top and bottom of said flues forming air-tight floors between the parallel flues, and means for passing the air horizontally between said floors and in contact with the walls of the flue-tile.

2. In a recuperator comprising a chamber inclosed by side walls, the combination of a plurality of spaced apart, vertically disposed waste gas flues formed of flue tile assembled in alined relation and interlocking flange-tile interposed between the alined flue-tile, the flange-tile in the same horizontal plane interengaging to brace the flue-tile in proper position, flange-tile at the top and bottom of said flues forming air-tight floors between the parallel lines and intermediate floors comprised of said flange-tile forming air chambers, said intermediate floors being apertured at alternate ends to provide means for the air to flow vertically from one air-chamber to the other and to flow horizontally and in opposite directions through the air-chambers.

3. In combination with a furnace having an outlet for waste gases and an inlet for air, a recuperator comprising a chamber laterally enclosed by vertical walls, vertically disposed flues within said chamber, connections between one end of said flues and the waste gas outlet of the furnace, escape means connected to the other ends of said flues, means surrounding said escape means for preliminarily heating the air to be admitted to the recuperator chamber, means for causing said preliminarily heated air to pass through the recuperator chamber between said flues, and means for leading the air from the interior of the recuperator chamber to the air inlet of the furnace.

4. In a recuperator comprising a chamber enclosed by vertical walls, the combination of a plurality of vertical flues in said chamber through which the waste gases pass vertically, a domed top for said chamber, an air-jacket surrounding said domed top, and means connected to said jacket whereby the air from said jacket is caused to pass through said recuperator in contact with the walls of said flues.

5. In combination with a furnace provided with an outlet for waste furnace gases and an air inlet, of a recuperator comprising a chamber laterally enclosed by vertical walls, vertically disposed flues within said chamber, one end of said flues being connected to the furnace outlet for waste gases and the other end of said flues being connected to escape means, means surrounding said escape means for preliminarily heating the air to be admitted to the recuperator chamber, means for causing said preliminarily heated air to pass through said chamber between said flues, and means for delivering the air preheated in said recuperator chamber to the air inlet of the furnace.

6. In combination with a furnace provided with an outlet for waste furnace gases and an air inlet, and a recuperator wherein the air to be admitted to said furnace is preheated by the waste gases from said furnace, of a waste gas flue connecting said furnace to said recuperator and a preheated air flue connecting the recuperator to the furnace, said flues being in conductive proximity whereby by heat transference the temperatures of the waste furnace gases are reduced below the refractory limits of the recuperator and the air preheated in the recuperator is superheated during its passage to the furnace.

7. In combination with a furnace provided with an outlet for waste furnace gases and an air inlet, and a recuperator wherein the air to be admitted to said furnace is preheated by the waste gases from said furnace, of a waste gas flue connecting said furnace to said recuperator and a preheated air flue connecting the recuperator to the furnace, said flues being separated by relatively thin refractory walls whereby a heat transference by conductivity occurs and a portion of the heat of the waste gases is transferred to the preheated air during the passage of the latter from the recuperator to the furnace.

8. In combination with a furnace and a recuperator receiving the waste furnace gases from said furnace and delivering preheated air to said furnace, of means including passages for the travel of the waste furnace gases and the preheated air having a common partition wall whereby a heat transference is effected by conductivity from the waste furnace gases while traveling from the furnace to the recuperator to the preheated air while the latter is traveling from the recuperator to the furnace.

Signed at Pittsburgh, Pa., this 18th day of July, 1925.

WILLIAM A. MORTON.